United States Patent [19]

Gram

[11] Patent Number: 5,680,923
[45] Date of Patent: Oct. 28, 1997

[54] MEANS FOR TEMPORARY STORING OF SUBJECTS

[76] Inventor: Klaus Gram, Gaboel Byvej 28, Gaboel, DK-6500 Vojens, Denmark

[21] Appl. No.: 525,691

[22] PCT Filed: Apr. 14, 1994

[86] PCT No.: PCT/DK94/00151

§ 371 Date: Sep. 29, 1995

§ 102(e) Date: Sep. 29, 1995

[87] PCT Pub. No.: WO94/24026

PCT Pub. Date: Oct. 27, 1994

[30] Foreign Application Priority Data

Apr. 14, 1993 [DK] Denmark .................. 0426/93

[51] Int. Cl.$^6$ ............................. B65G 21/18
[52] U.S. Cl. .................. 198/778; 198/812; 62/380
[58] Field of Search .................. 198/778, 812; 62/380, 381

[56] References Cited

U.S. PATENT DOCUMENTS

| | | | |
|---|---|---|---|
| 2,933,176 | 4/1960 | Mansson | 198/812 |
| 3,857,252 | 12/1974 | Wight. | |
| 4,168,776 | 9/1979 | Hoeboer. | |
| 4,184,588 | 1/1980 | Lapeyre | 198/778 |
| 4,231,470 | 11/1980 | Parkes | 198/812 |
| 4,513,858 | 4/1985 | Fellner et al. | |
| 4,669,278 | 6/1987 | Lee, Jr. et al. | |
| 5,361,888 | 11/1994 | Brown et al. | 198/778 |

FOREIGN PATENT DOCUMENTS

| | | |
|---|---|---|
| 0196373 | 10/1986 | European Pat. Off. . |
| 0451398 | 10/1991 | European Pat. Off. . |
| 2248193 | 4/1974 | Germany . |
| 1497340 | 1/1978 | United Kingdom . |

Primary Examiner—Joseph E. Valenza
Attorney, Agent, or Firm—Thomas R. Vigil

[57] ABSTRACT

A plant (1), preferably a freezer tunnel for temporary storage of items and comprising an inlet station (3) and a discharge station (2) and a conveyor (4) for carrying the items through the plant, may be provided with a buffer effect in a simple manner. The conveyor (4) loops around fixed turning rolls (9) and around displaceable turning rolls (8) positioned on a trolley (17) which can be displaced back and forth between the fixed turning rolls (9). The buffer storage is established in that a drive member (14) for the conveyor (4) is provided both at the inlet and the discharge station (2, 3). Any one of these two drive members is constructed to be operated at a speed that is different from the speed of the other drive member. As the trolley (17) is in a freely displaceable position, a difference in speed will mean that the conveyor section (24) between the trolley (17) and the fixed turning rolls at one side of the plant may be enlarged and reduced. The conveyor section (24) will run between the two stations without being loaded with items for storage.

9 Claims, 5 Drawing Sheets

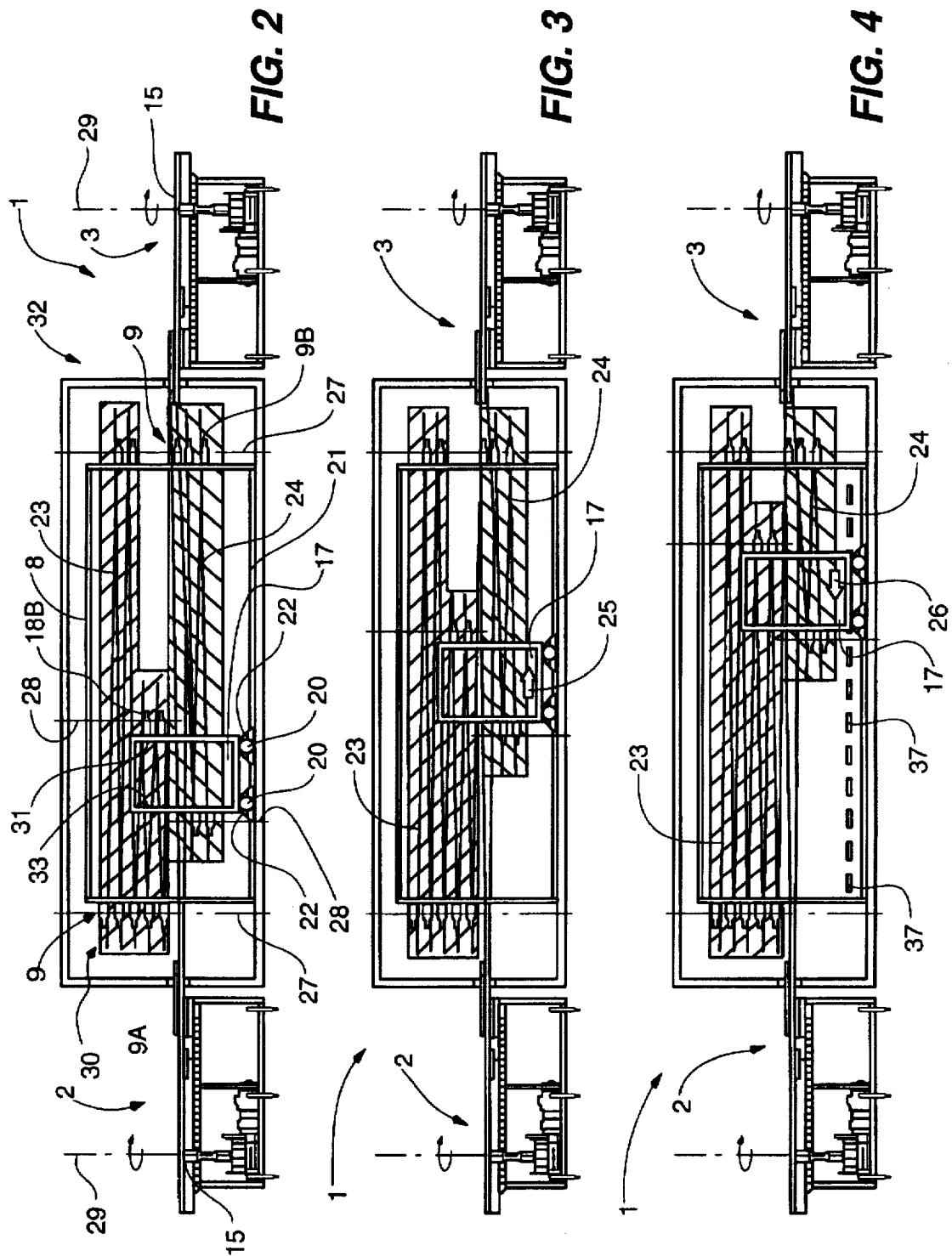

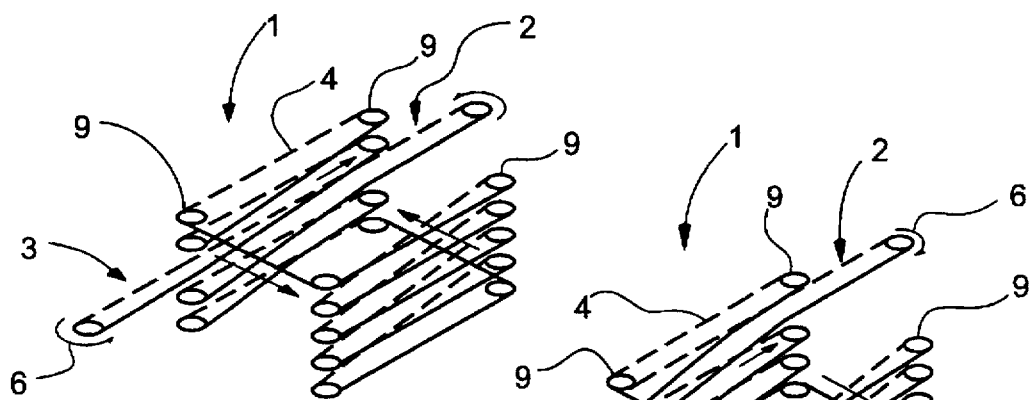
FIG. 6
FIG. 7
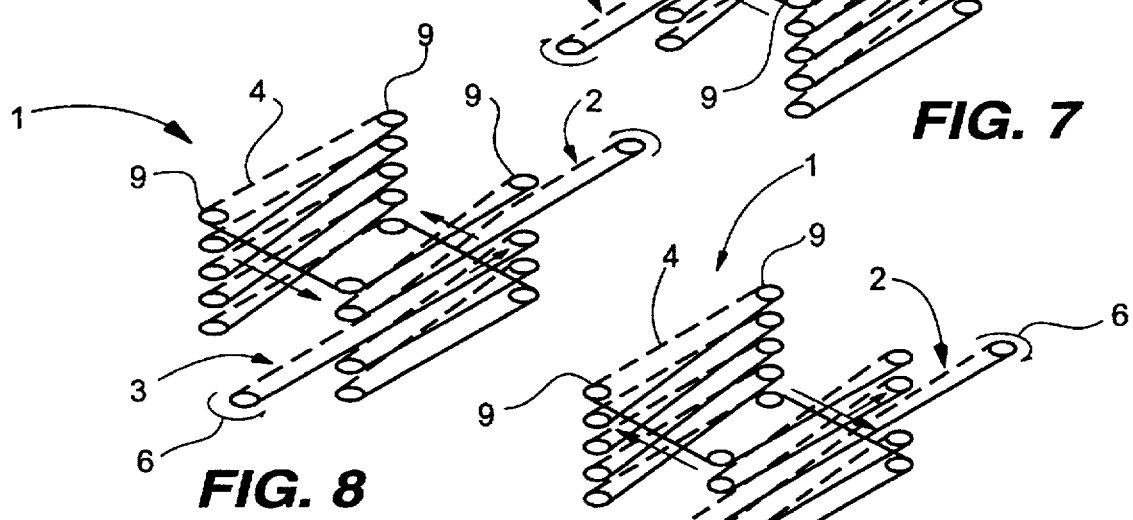
FIG. 8
FIG. 9
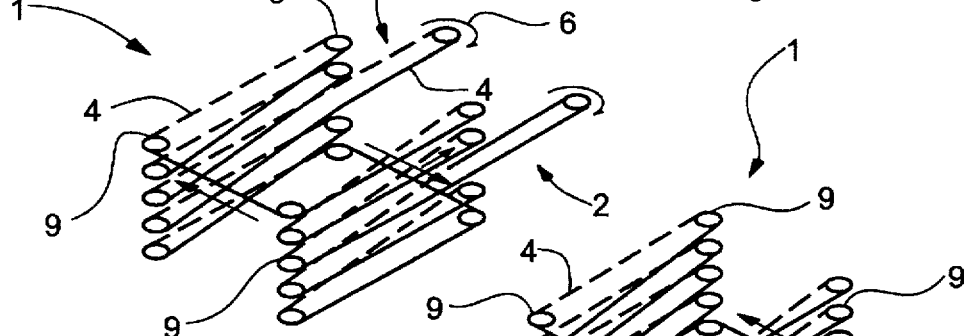
FIG. 10
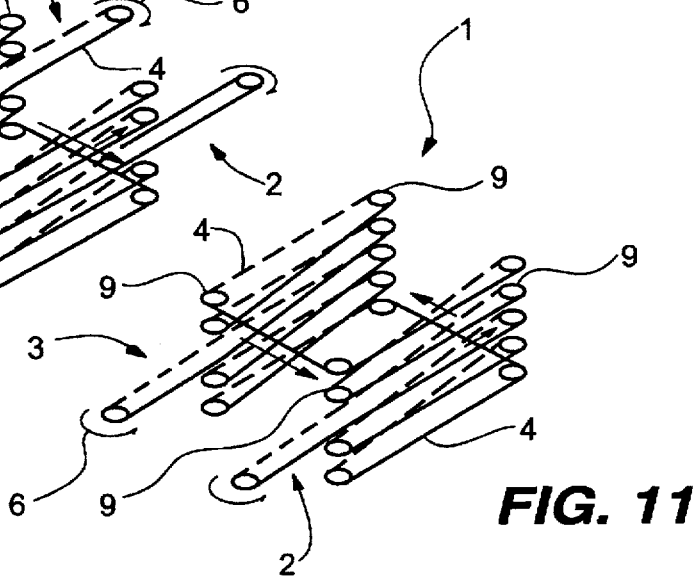
FIG. 11

1

MEANS FOR TEMPORARY STORING OF SUBJECTS

BACKGROUND OF THE INVENTION

The present invention relates to a plant for temporary storage of items, preferably a freezer tunnel having an inlet station and a discharge station, drive members for the conveyor both at the inlet and discharge stations, and a conveyor for conveying the items from the inlet station through the plant to the discharge station, said conveyor looping around fixed turning rolls located opposite each other in the plant and around turning rolls that are displaceable in relation thereto as they are placed on at least one trolley which can be slid back and forth between said fixed turning rolls freely displaceable as a result of the lengths of conveyors in conveyor sections on either side of the trolley and the speeds of the drive members only, wherein the fixed turning rolls of the plant are arranged in at least one row with rotation around a mutual axis.

Plants in which items are stored temporarily, possibly while being subjected to simultaneous treatment, will often be part of a process line. Either the inlet station or the discharge station of such a process line will frequently have to be operated at a continuous and constant speed determined by the speed of operation of the other machines forming part of the process line.

A plant of the type mentioned in the introduction may be used as a buffer in such a process line. Thereby, machines on either side of the plant may continue at a constant speed while minor operational interruptions or stoppages are absorbed by the plant buffer, which is provided with the possibility of displacing the trolley back and forth between the fixed turning rolls.

Particularly in freezer tunnels it is essential that the conveyor belt at the inlet station may be driven at a continuous fixed speed because an ice-cream extruder supplying the inlet station with products must operate at a constant speed for the sake of the ice-cream composition.

Packing machines situated in connection with the discharge station of the freezer tunnel may frequently be subject to larger or shorter stoppages. However, these machines are also able to operate at an increased operational speed compared to normal operation speed.

Upon stoppages in such packing machines, the frozen products were hitherto removed from the discharge station and returned for processing if this was possible, or it has been necessary to dispose of the frozen products. This disposal of the products has frequently been chosen because it is very time-consuming to stop an ice-cream extruder and subsequently restart it. This is because stopping and subsequently restarting an extruder takes a good deal of time and much ice-cream material before a balance occurs in the process line that permits the production of products with a satisfactory quality.

Plants of the type mentioned in the introduction for temporary storage of items are known, e.g. from German publication No. 2,248,193.

However, a plant according to said German publication would not be suitable for use in situations when the temporary storage of the items must take place for a predetermined storage time in the plant. This may, for example, be the case in a freezer tunnel where items are to be frozen. It may also, however, be the case in other plants where the items are to be subjected to heat treatment, hardening or some other treatment that requires a minimum storage time in a treatment plant. Thus, the known plant assumes that the items should primarily be discharged as soon as possible in order to keep as much storing room vacant as possible.

The plant is further disadvantageous in that the drive members used are only designed to be driven at a predetermined speed. One or the other of the drive members may be stopped when it is desirable to fill or empty the store room, but a variation of speed is not possible.

Furthermore, stopping either of the drive members will at the same time necessitate activation of additional drive members which permit changing the size of the stock via a clutch. The stock size is varied by pulling the trolleys one way or the other by means of chains, which are connected to the additional drive members by means of the clutches. The plant is thus disadvantageous as the trolley is not freely displaceable as a result of the drive member speeds only, and as it requires the use of supervision equipment connecting the conveyor drive members with the additional drive members of the trolleys.

Freezer tunnels are operated at temperatures as low as minus 40° C. The known plant will be unsuited for use under such conditions as there will be a substantial risk that formations of ice will make correct functioning of the clutches and the turning rolls impossible. In freezer tunnels it is important to minimize the number of moveable elements in order to avoid functional failures due to icing. Besides, it should preferably be possible to keep the elements placed in the freezer tunnel in motion in order to ensure correct functioning. The known plant will necessitate the use of a large number of turning rolls for driving the trolleys. The ice formations will hamper the correct functioning of such rolls which will only be used for short periods at time intervals that may have very different lengths.

U.S. Pat. No. 4,513,858 describes a conveyor system for a plant of the type mentioned in the introduction. In this conveyor system an infeed drive mechanism controls the accumulation of incoming items whereas a discharge drive mechanism controls the discharge of outgoing items. The conveying means of the system are driven by belts which, in turn, are driven by pulley wheels attached directly to the motors of the drive mechanisms. Thus, the speed of the drive mechanisms is determined directly by the predetermined operating speed of the motors. One or the other of the motors may be operated faster than the other motor. However, there is no indication of the possibility of randomely varying the speeds of the drive mechanisms independently of each other.

The system according to the U.S. patent comprises a plurality of conveyor means and, correspondingly, a large number of movable elements. In a freezer tunnel, therefore, this system is liable to the same disadvantages as described above with reference to the German publication.

Finally, the system according to the U.S. patent operates strictly horizontally. In order to accumulate items in two or more levels, the U.S. patent proposes to place two or more accumulator sections above each other. This solution involves additional drive members and additional conveyor means as well as additional devices for obtaining a synchronous operation of the conveyors of all levels. Again this results in a very comprehensive and, therefore, disadvantageous system.

It is the object of the present invention to provide a plant of the type mentioned in the introduction and permitting to remedy the disadvantages of the known plants, said plant being particularly suited for use in freezer tunnels and at the same time being constructed in a technically simple and an operationally reliable manner.

This is obtained according to the present invention by a plant of the type mentioned in the introduction and being characterized in that one of the two drive members is designed to be operated at a randomly variable speed in relation to that of the other drive member, and that said at least one trolley comprises a plurality of displaceable turning rolls on each side of the trolley, that the fixed turning rolls are arranged in more than one parallel plane, that the plurality of displaceable turning rolls on each side are arranged in more than one parallel plane so that the conveyor extends in more levels defined by the parallel planes, as it loops around the fixed turning rolls and the displaceable turning rolls according to a helical track and that the plurality of the displaceable turning rolls on each side of the trolley are arranged in at least one row with rotation, in said row or each of said rows, around an axis parallel to the rotation axes of the fixed turning rolls.

As the drive members of the conveyor are provided at the inlet and discharge stations, reliable operation is secured, since they are thus situated outside the part of the plant in which a treatment takes place which might reduce the operational reliability. Thus, the drive members will run under operational conditions existing at ordinary room temperature.

As the drive members are constructed in such a manner that one of them may be operated at a random speed in relation to the other, and as the trolley is at the same time provided freely displaceable, it is possible to displace the trolley back and forth between the fixed turning rolls simply by varying the difference in speed between the drive members. Thus, it is not necessary to use special members in order to provide the trolley displacement and a consequent change in storage size. The plant may optionally be provided with several trolleys comprising the displaceable turning rolls. Thus, it is possible to use several trolleys if it is desirable to construct the plant with a shorter total length.

It is not only possible to provide a plant of simple construction but it is also very reliable in operation. The only movable elements present in the plant are the fixed and displaceable turning rolls. All the turning rolls are in constant motion when the plant is running under normal operational conditions, i.e. at a constant speed for the two drive members. In this case the conveyor speeds in the inlet and discharge stations will be identical. When operational interruptions occur, the turning rolls will still be kept moving, however, at a speed that deviates from the normal operational situation.

If an abnormal situation arises, eg. a speed reduction or a total stoppage in the discharge station, the inlet station may still be run at normal operational speed. When this happens, the conveyor will displace the trolley in order to increase the number of stored items, while a section of the conveyor that is empty during normal operation will reduce.

When a normal situation has been reestablished at the discharge station, it will be possible to run the drive member of the discharge station at a speed that is higher than the speed of the inlet station drive member, which may still be maintained at normal speed. As the conveyor speed at the discharge station is now higher than the conveyor speed at the inlet station, the conveyor will pull the trolley in the opposite direction. As a result, more items are removed from the conveyor than are added and the empty section of the conveyor will consequently enlarge.

The plant will preferably be provided with means which automatically control the position of the trolley and as a result thereof operate the drive members for an automatic adjustment of the storage size.

It should be understood that the plant may also be used in a situation where the speed at the inlet station is reduced or stopped and where the speed at the discharge station is kept constant. It is also possible to use the plant in situations where the speed is reduced or stopped totally at random moments in both the inlet station and the discharge station.

A plant according to the invention will be able to work as a buffer in a process plant where there is a requirement that the drive member of either the inlet station or the discharge station should operate the conveyor continuously at a fixed speed determined by the other elements forming part of such a process plant. An example of this is a machine for extruding ice cream onto a conveyor at the inlet station of a freezer tunnel.

The ice-cream extruder shall function continuously at a fixed speed in order to maintain the correct composition and homogeneity of the product to be stored on the conveyor in the inlet station. As the discharge station may be stopped, it will not be necessary to remove and perhaps dispose of frozen products in order to maintain continuous extruder operation. During the short stoppages of the packing machine, the plant buffer is utilized, and when the packing machine is put back into operation, it will take place at a speed that exceeds the normal speed so that the plant buffer is built up into maximum size before the speed of the discharge station and the packing equipment is in turn reduced to normal operational speed. The control is thus dependent only on the speed variation between the two drive members.

DESCRIPTION OF THE DRAWING

The present invention will now be described in further detail with reference to the attached drawing, in which FIGS. 2–4 show schematic, sectional side views of certain parts for illustration of different operational situations of a plant according to the invention, FIG. 5 a schematic view from above of the plant shown in FIGS. 2–4, FIGS. 6–11 schematic, perspective views for illustration of alternative embodiments of a plant according to the invention, FIG. 12 a schematic view corresponding to FIG. 5 of a further embodiment of a plant according to the invention, and FIG. 13 a schematic, perspective view corresponding to FIGS. 6–11 of the plant shown in FIG. 12.

Figure 1:
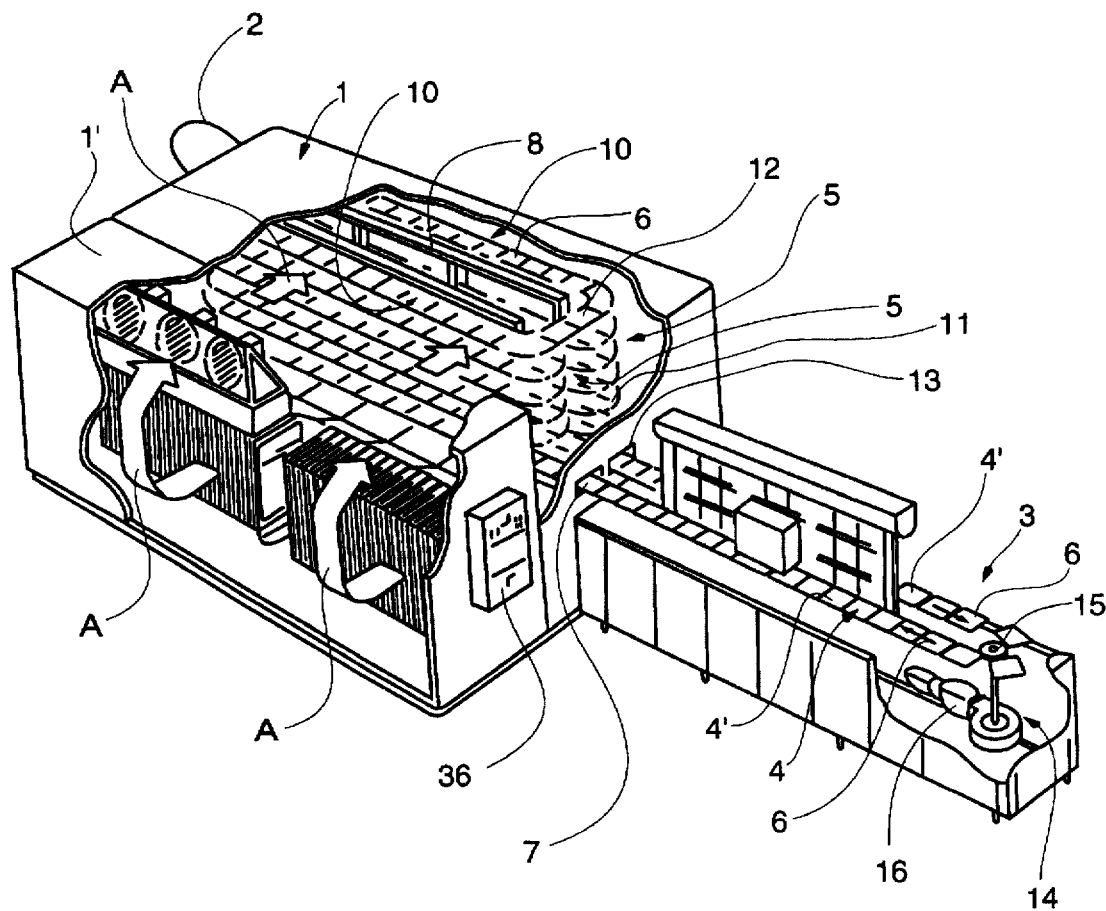
FIG. 1 shows a schematic, perspective embodiment of a plant according to the invention with certain parts broken away.

The plant shown in FIG. 1 comprises a freezer tunnel and the invention will be explained below with specific reference to such a freezer tunnel.

Thus, the plant comprises a freezer tunnel 1 constructed for temporary storage of items which are frozen in the freezer tunnel. The plant 1 further comprises a discharge station 2 (only illustrated schematically in FIG. 1) and an inlet station 3. The plant also comprises a conveyor 4 which, in the embodiment shown, is constructed as a tray conveyor, i.e. trays 4' which are placed independently in relation to each other and connected by a chain so that said conveyor 4 is able to move in loops through the plant. Such loops 5 are indicated in the freezer tunnel 1.

The direction of the conveyor 4's movements is indicated by arrows 6. The conveyor 4 is moved from the inlet station 3 into the freezer tunnel 1 through an opening 7. Inside the freezer tunnel 1 is a frame 8 on which fixed turning rolls 9 are provided (see FIG. 2). The conveyor is moved in loops through a first oval, helical track in which the conveyor moves alternately along straight tracks 10 and rounded end turning tracks 11 around turning rolls 9 so that the conveyor is moved upwards inside the freezer tunnel 1. When the conveyor has reached the uppermost turn of the first looping helical track, it is moved via a transfer track 12 into a second oval, helical track, whereupon the conveyor is moved in loops through said track downwards to leave the freezer tunnel 1 via an opening 13. Before passing through the opening 13 into the inlet station 3, the conveyor will move out through openings, not shown, in the other end of the freezer tunnel 1 in order to pass through the discharge station 2.

Both the inlet station 3 and the discharge station 2 comprise a drive member 14 comprising an additional turning roll 15 positioned as an extension of one of the looping tracks and forming a drive wheel of the conveyor. The drive member also comprises a drive unit 16 constructed in such a manner that each drive wheel 15 may be driven at a random speed in relation to the drive wheel 15 of the other station.

When the conveyor 4 with the items placed on it is led through the freezer tunnel, freezing takes place. The freezer tunnel 1 is thus connected with a freezer section 1' which will bring the temperature down to about minus 40° C. The air is circulated through the freezer tunnel 1 and the freezer section 1' as indicated by arrows A.

The plant further comprises a trolley 17 which is not seen in FIG. 1 and which will be explained in further detail below with reference to FIGS. 2–5.

In addition to the fixed turning rolls 9, as appears from FIGS. 2–5, turning rolls 18 are provided which are displaceable back and forth between the fixed turning rolls 9 because they are mounted on a frame 19 of the trolley 17. The trolley 17 of the shown embodiment is provided with wheels or rolls 20. The wheels 20 run on rails 21, which are heated in order to avoid formations of ice and to permit free displacement of the trolley 17. As an alternative to wheels 20, the trolley 17 may instead be provided with slide blocks sliding on tracks 21. On either side of the wheels scraping means 22 are provided which ensure cleaning of the tracks 21 and thus provide further safety for the free displacement of the trolley 17.

The conveyor 4, which is situated inside the freezer tunnel, may be divided into two sections 23, 24. A first section 23 is provided with slanted hatching extending upwards to the left and a second section 24 provided with slanted hatching extending upwards to the right. The section 23 is the part of the conveyor that is supplied with products to be frozen. The section 24 comprises the part of the conveyor 4 that is empty. Thus, the section 24 may be conceived as a buffer storage.

The part of the conveyor situated in section 24 may be reduced if the conveyor is stopped or operated at reduced speed in the discharge station 2 while normal operational conveyor speed is maintained in the inlet station 3. This situation is illustrated in FIG. 3 where an arrow 25 indicates the displacement of the trolley 17 to the right whereby section 24 is reduced whereas section 23 is enlarged.

FIG. 4 shows a situation where the buffer storage of section 24 is enlarged whereas section 23 is reduced. Still assuming that the conveyor is operated at normal speed at the inlet station 3, an increased speed of the conveyor 4 in the discharge station 2 will cause the trolley to be moved to the left, as indicated by an arrow 26. In this manner, section 24 is enlarged until the buffer storage reaches a new desired size.

When the conveyor 4 is operated at identical speeds in the discharge station 2 and the inlet station 3, the trolley 17 will remain in the position in which it is situated when the equal operational speeds of the two stations 2, 3 occur. This situation is illustrated in FIG. 2.

In FIGS. 2–5 the fixed turning rolls 9 are arranged in two rows having rotation around a mutual axis 27. In the case of an ordinary freezer tunnel, these axes will be oriented vertically, but a plant according to the invention may have a different orientation, and it will also be possible to place the turning rolls side by side. At either side 31, 33 of the trolley 17, the movable turning rolls 18 are arranged in rows 28 having rotation around a mutual axis 28 parallel to the axis of rotation 27 of the fixed turning rolls. The additional turning rolls 15 which are provided in the discharge station 2 and the inlet station 3 also rotate around axes 29 parallel to the axes of rotation 27, 28.

The movable turning rolls 18B, which cooperate with fixed turning rolls 9A at one side 30 of the plant 1, are placed at the side 31 of the trolley 17 that faces away from said one side 30 of the plant 1. Likewise, the movable turning rolls 18A, which cooperate with fixed turning rolls 9B at the other side 32 of the plant 1 will be placed at the side 33 of the trolley that faces away from the other side 32 of the plant. It should be understood that the trolley may alternatively be provided with turning rolls that are placed opposite each other on both sides of the trolley and which will cooperate with the fixed turning rolls 9 that are placed directly opposite a displaceable turning roll 18.

Figure 5:
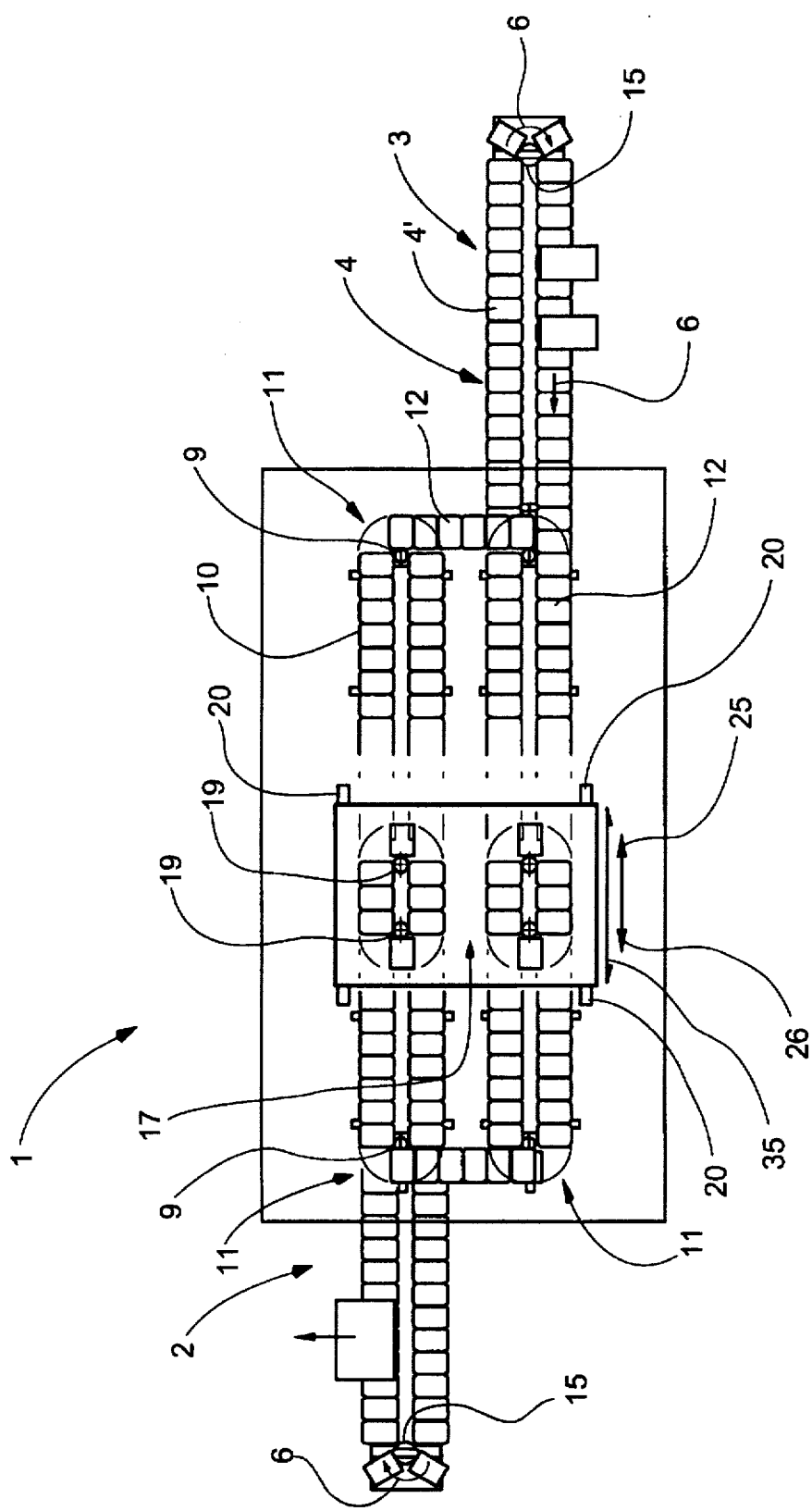

FIG. 5 illustrates schematically an outer limit 34 of the trolley 17. It illustrates schematically an alternative position of the wheels 20 at the outer limit 34 of the trolley. The shown position of the wheels at a large distance 35 from one another is desirable in order to stabilize the trolley as well as possible against overturning as a result of the uneven pull which the conveyor 4 exercises on the trolley 17 via the turning rolls 18 positioned thereon.

The plant 1 is provided with means 36 for controlling the motor members 14 in order to obtain the desired operational speed in the discharge station 2 and the inlet station 3 in different operational situations. The control means 36 are connected with means which are illustrated at 37 and are intended to register the position of the trolley 17 between the fixed turning rolls 9. Depending on the registration of the position of the trolley 17 it will be possible, via the control means 36, to increase or reduce the speed of the conveyor in the discharge station or the inlet station in order to change the relative sizes of the two conveyor sections 23 and 24.

The inlet station 3 must be operated at a fixed and continuous speed due to previous extruders in the process line whereas the discharge station 2 may be subject to production stoppages or reduced speed owing to stoppages of a subsequent packing machine in the process line. In this situation, the regulation of the relative sizes of the sections 23 and 24 may be accomplished simply by increasing the speed in the discharge station 2 when a stoppage has been remedied. In this manner it is possible to displace the trolley 17 as far as possible to the left in order to establish the largest possible buffer by making the section 24 as large as possible.

As an actual example, the plant may be comprised of a freezing tunnel 1 with a tray conveyor 4 containing a total of approx. 1,100 trays the minimum number of trays 4' positioned in the section 23 being approx. 700 whereas the maximum number present in the section 24 is approx. 400 trays. When such a plant is operated at a normal operational speed of approx. 10 meters per minute, 35 trays per minute will be conveyed. Due to the rounded end turning tracks 5, it is impossible to empty the section 24 completely, and the effective buffer storage will amount to approx. 210 trays. This will provide a buffer time of approx. 6 minutes.

Experience has shown that such a buffer time is fully sufficient to absorb the majority of all the operational stoppages that occur. However, the buffer time may be varied between 4 and 8 minutes, and the minimum number of trays in the section 23 of the freezing tunnel may be varied between approx. 400 and 700 trays.

In order to optain sufficiently rapid establishment of the buffer storage, the speed variation of the motor members compared to normal operational speed must be between approx. ±10% and up to ±30%.

FIGS. 6–11 show schematic views of alternative embodiments of a plant according to the invention. These alternative embodiments are shown as alternative tracks of the conveyor 4 through the freezer tunnel 1. For simplicity the trolley 17 is not shown. However, the trolley 17 will be placed in a position between the fixed turning rolls 9. The Figures show different ways in which the discharge station 2 and the inlet station 3 may be positioned in relation to the freezer tunnel 1 itself. As all elements included in the embodiments shown in FIGS. 6–11 will correspond to the elements described above, no detailed description thereof will be given. The manner in which the alternative embodiments are operated will also correspond to the above description of the plant operation.

Figure 12:
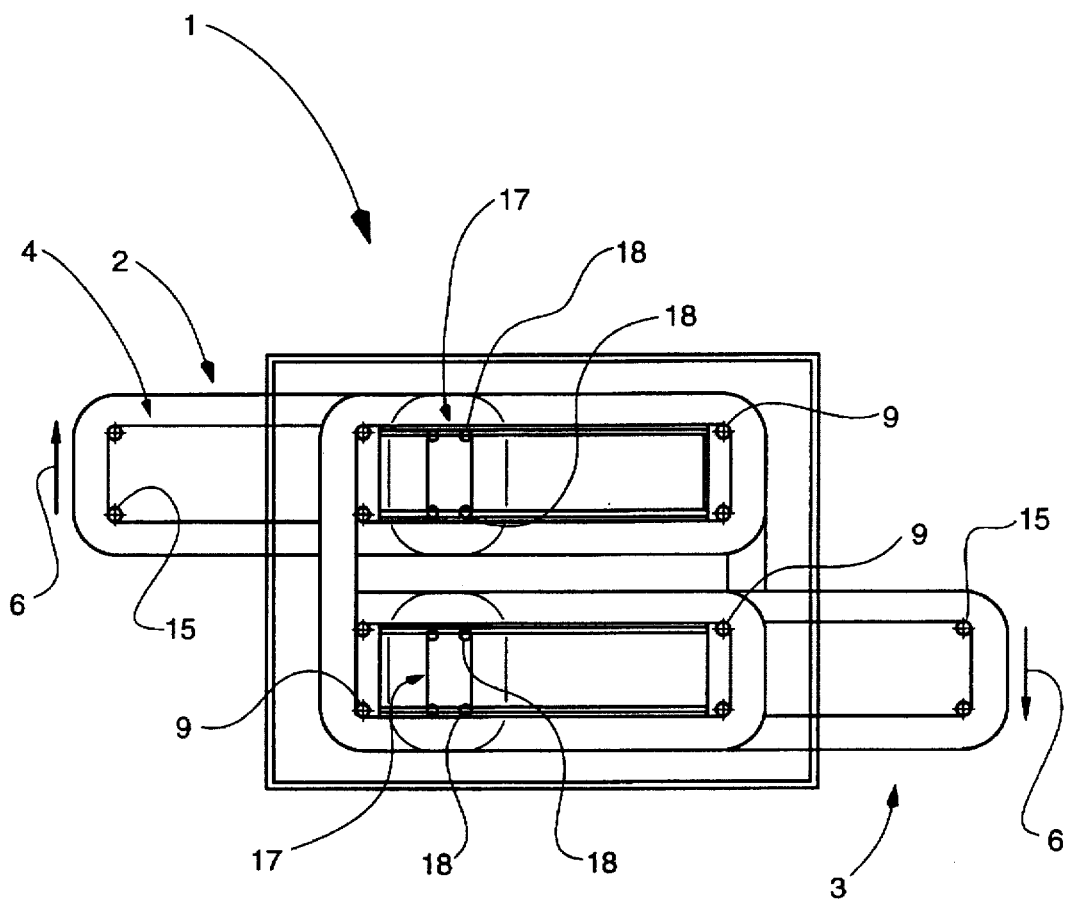

FIG. 12 shows a schematic view corresponding to FIG. 5 of a further embodiment of a plant 1. Identical parts have been given the same reference numerals and, therefore, will not be explained in detail. The embodiment shown in FIG. 12 differs from the one shown in FIG. 5 by comprising two separate trolleys 17 provided with turning rolls 18. The trolleys 17 are provided with wheels (not shown) which run on rails (not shown). Alternatively, they may be provided with slide blocks sliding on the rails.

Figure 13:
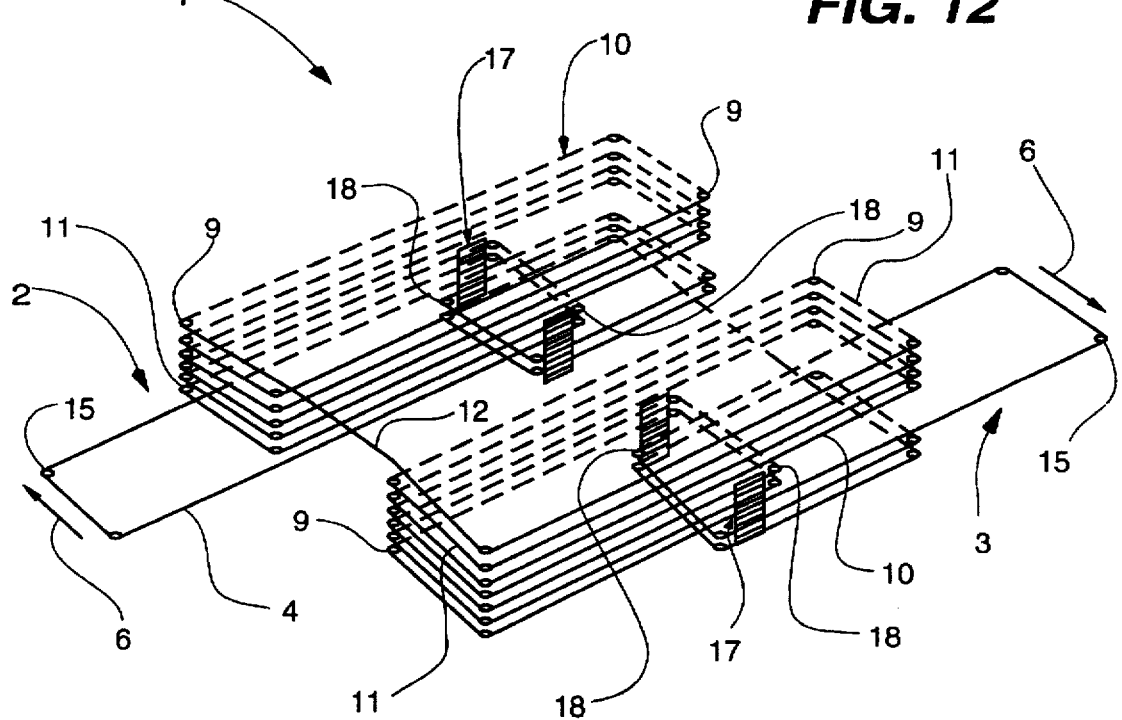

By providing two trolleys 17 instead of a single trolley 17, such as shown in FIG. 5, a reduction of the total plant length may be obtained. Each of the trolleys 17 is provided with a frame 19 on which the turning rolls 18 are positioned. In this way one obtains a considerably shorter but, on the other hand, wider plant. This offers new possibilities of fitting the plant into existing production rooms. The plant illustrated in FIGS. 12 and 13 may, as an example, be changed from a length/width dimension of 16×5 meters to a length/width dimension of approx. 10×8 meters for the same number of trays 4' in the conveyor 4.

We claim:

1. A plant for temporary storage of items, preferably a freezer tunnel (1) having an inlet station (3) and a discharge station (2), drive members (14) for the conveyor (4) both at the inlet and discharge stations, and a conveyor (4) for conveying the items from the inlet station (2), said conveyor (4) looping around fixed turning rolls (9) located opposite each other in the plant (1) and around turning rolls (18) that are displaceable in relation thereto as they are placed on at least one trolley (17) which can be slid back and forth between said fixed turning rolls (9) freely displaceable as a result of the lengths of conveyors (4) in conveyor sections (23, 24) on either side of the trolley and the speeds of the drive members (14) only, wherein the fixed turning rolls (9) of the plant are arranged in at least one row with rotation about a mutual axis (27), characterized in that one of the two drive members (14) is designed to be operated at a randomly variable speed in relation to that of the other drive member, and that said at least one trolley (17) comprises a plurality of displaceable turning rolls (18) on each side of the trolley, that the fixed turning rolls (9) are arranged in more than one parallel plane, that the plurality of displaceable turning rolls (18) on each side are arranged in more than one parallel plane so that the conveyor (4) extends in more levels defined by the parallel planes, as it loops around the fixed turning rolls (9) and the displaceable turning rolls (18) according to a helical track, and that the plurality of the displaceable turning rolls (18) on each side of the trolley (17) are arranged in at least one row with rotation, in said row or each of said rows, about an axis (28) parallel to the rotation axes (27) of the fixed turning rolls (9).

2. A plant according to claim 1, characterized in that at least one drive member (14) is designed to drive the conveyor (4) continuously at a fixed speed at the station (2, 3) in question.

3. A plant according to claim 1, characterized in that the turning rolls (18) of the trolley (17), which cooperate to form the loops with the fixed turning rolls (9) at one side of the plant, are positioned on the side of the trolley (17) facing away from said side of the plant.

4. A plant according to claim 1, characterized in that the inlet and discharge stations (3, 2) are both composed of a loop section which is extended beyond the extension of the other loops of the conveyor and which runs around at least one additional fixed turning wheel (15).

5. A plant according to claim 4, characterized in that said at least one additional turning wheel (15) in either station (2, 3) is connected with the drive members (14) of the conveyor (4).

6. A plant according to claim 1, characterized in that the free displacement of the trolley (17) is established by means of wheels (20) running on rails (21), and that scraping means (22) for cleaning the rails (21) are provided on either side of the trolley wheels (20).

7. A plant according to claim 6, characterized in that the free displacement of the trolley (17) is provided by means of slide blocks sliding on rails (21).

8. A plant according to claim 7 and being of the type that constitutes a freezer tunnel, characterized in that the rails (21) are heated.

9. A plant according to claim 1, characterized in that means (37) are provided for registrations of the position of the trolley (18) between the fixed turning rolls (9), and that said registration means (37) are connected with means (36) for operating the motor members (14).

* * * * *